W. R. ANDREWS.
SHEDDING-MECHANISMS FOR LOOMS.
No. 192,960. Patented July 10, 1877.
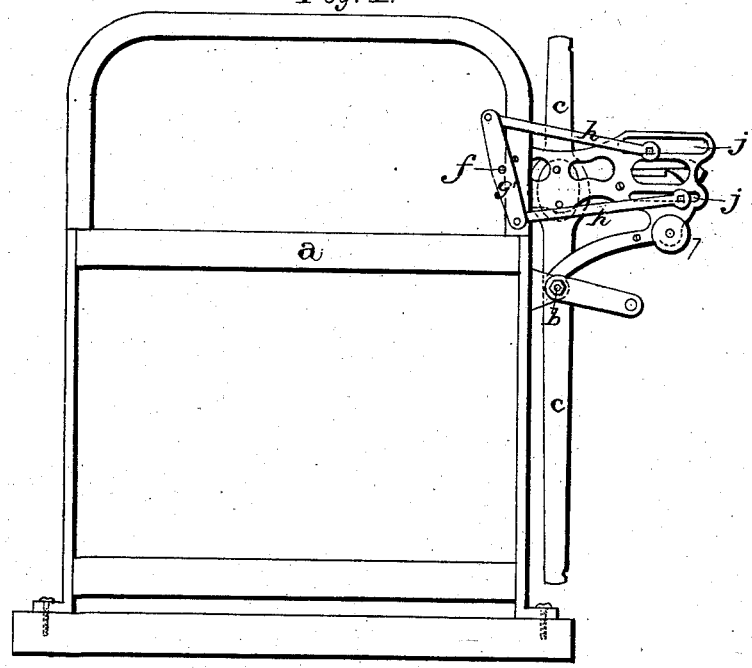
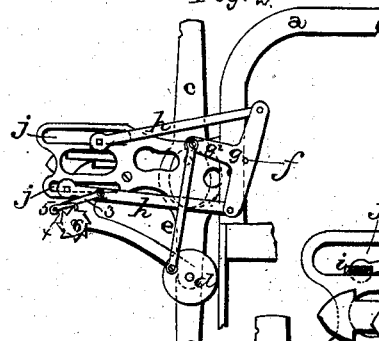
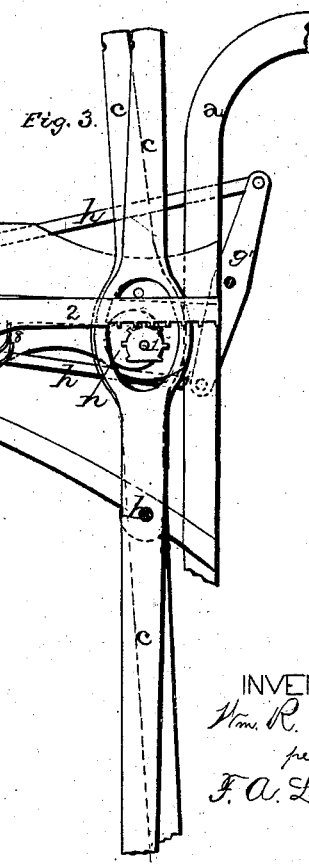
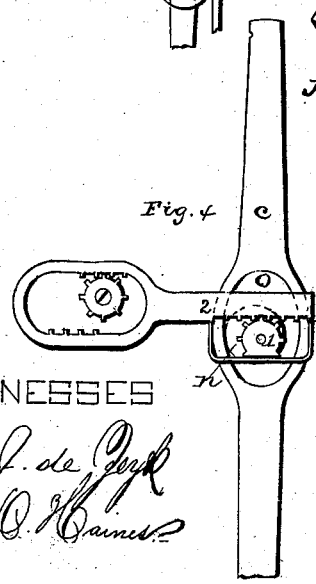
WITNESSES
Albert J. de Peyk
W. S. D. Haines
INVENTOR
Wm. R. Andrews
per
F. A. Lehmann,
Atty.

UNITED STATES PATENT OFFICE.

WILLIAM R. ANDREWS, OF MANSFIELD, CONNECTICUT.

IMPROVEMENT IN SHEDDING MECHANISMS FOR LOOMS.

Specification forming part of Letters Patent No. 192,960, dated July 10, 1877; application filed June 2, 1877.

*To all whom it may concern:*

Be it known that I, WILLIAM R. ANDREWS, of Mansfield, in the county of Tolland and State of Connecticut, have invented certain new and useful Improvements in the Movement of Heddles for Looms; and I do hereby declare the following to be a full, clear, and exact description of the invention, such as will enable others skilled in the art to which it pertains to make and use it, reference being had to the accompanying drawings, which form part of this specification.

My invention relates to an improvement in the mechanism for operating the heddles for looms; and it consists in the combination of eccentrics, each having a gear on one side, the said eccentrics working in oval openings in pivoted vertical levers, and rack-bars which turn the gears, with which they mesh, and cause the eccentrics to turn partially around in the aforesaid oval openings made in the levers, said rack-bars or jacks being under control of a pattern, and operated by lifters or depressors, and thus the levers are caused to rock back and forth upon their pivots, all of which will be more fully described hereinafter.

The accompanying drawings fully represent my invention.

*a* represents a frame of any suitable shape, size, or construction, upon one side of which, at any suitable point, is located the mechanism to which my invention relates. *b* represents the operating-shaft, which has a crank or wheel, *d*, with a wrist-pin on its inner end, for operating the other parts through the connecting-rod *e*. Rigidly fastened to each end of the shaft *f* is a lever, *g g*¹, the one, *g*, having an arm, *g*², extending from its inner edge, for attaching the lever to the rod *e*. Pivoted to each end of the two levers *g g*¹ are the rods *h*, which rods *h* have their opposite ends secured to the lifters or depressors *i*, the said lifters or depressors being made to move back and forth in the slots *j* as the levers *g g*¹ rock back and forth.

In each one of the long levers *c* is an oval opening, *o*, in which is placed an eccentric, *n*, that turns back and forth just sufficiently far to cause the levers to alternately rock back and forth upon their pivot. To the outer side of each eccentric is secured a small pinion or gear, 1, each of said pinions meshing with a rack formed on the under side of the rear end of the jacks 2. These jacks have spear-shaped heads, as shown, and have a vertical as well as a back-and-forth motion. Pivoted to the front end of one of the lower rods *h* is a connecting-rod, 3, which has its lower end pivoted to the top of a bar, 4, which operates a pawl, 5, so as to intermittingly turn the ratchet-wheel 6. This ratchet is fastened to the end of the shaft, upon which the pattern drum or chain 7 is fastened, and which drum or roller has a number of teeth or projections extending from it. As this drum revolves, these teeth or projections strike against the under sides of the two spring-levers 8, which have their outer ends pivoted upon a suitable rod, and their inner ends left free to play up and down. These inner ends are alternately raised upward by the pins or projections on the drum, and each time that each one is raised upward it strikes against the under side of one of the jacks 2, and raises it upward until the outer end is raised above the level of the lower edge of the upper slot *j*. These ends always rise near the inner end of the slot, and just as the rods *h* are moving lifter *i* outward this rod catches behind the head and forces the jack 2 outward. As the jack 2 is thus forced outward the rack on its under side draws the pinion 1 around, and this pinion turns the eccentric sufficiently far around to throw the upper end of the long lever *c* outward. After the lifter *i* has moved the jack 2 outward as far as it can, the end of the jack drops downward by reason of the spring-lever dropping down from under it. As the front end of the jack drops it falls upon the depressor *i*, which catches behind the shoulder 9, just in the rear of the head, and pulls the jack inward again. As this jack moves inward just the reverse action takes place in the pinion and eccentric, and the lever is thrown inward again.

Instead of the jack 2 having but a single rack, the end may be enlarged, and two internal racks be formed, as shown. The drum or roller 7, or the usual chain used for such purpose, forms a pattern, and instead of the levers *c* moving as here shown, they may move horizontally, and there may be any desired number of them.

Having thus described my invention, I claim—

The combination of the heddle-lever c, provided with the opening o, pinion 1, eccentric n, jack 2, provided with rack, lifters i, pattern drum or chain, spring-levers, and an operating mechanism, substantially as described.

In testimony that I claim the foregoing I have hereunto set my hand this 25th day of May, 1877.

WILLIAM R. ANDREWS.

Witnesses:
ANSON FOWLER,
HENRY M. KELLY.